United States Patent [19]
Dao et al.

[11] Patent Number: 5,379,375
[45] Date of Patent: Jan. 3, 1995

[54] AUTOMATIC LOCATION OF SCREEN OBJECTS THROUGH THE USE OF RELATIONAL POSITION DATA

[75] Inventors: Vinh D. Dao, Cupertino; Sasha Ostojic, Sunnyvale, both of Calif.

[73] Assignee: International Business Machines Corporation, Armonk, N.Y.

[21] Appl. No.: 192,773

[22] Filed: Feb. 7, 1994

Related U.S. Application Data

[63] Continuation of Ser. No. 750,673, Aug. 27, 1991, abandoned.

[51] Int. Cl.⁶ .............................. G06F 15/62
[52] U.S. Cl. .............................................. 395/155
[58] Field of Search ........................ 395/155–161, 395/600, 800, 133–139; 345/121, 123; 379/67–68, 89, 265–266

[56] References Cited

U.S. PATENT DOCUMENTS

| | | | |
|---|---|---|---|
| 4,094,000 | 6/1978 | Brudevold | 340/711 X |
| 4,419,740 | 12/1983 | Hevenor, Jr. | 395/425 |
| 4,658,351 | 4/1987 | Teng | 395/600 |
| 4,712,191 | 12/1987 | Penna | 395/156 |
| 4,772,882 | 9/1988 | Mical | 395/156 X |
| 4,825,387 | 4/1989 | Ono | 364/525 |
| 4,899,136 | 2/1990 | Beard et al. | 395/157 X |
| 4,905,168 | 2/1990 | McCarthy et al. | 395/134 |
| 4,974,174 | 11/1990 | Kleinman | 395/156 X |
| 4,984,180 | 1/1991 | Wada et al. | 395/156 X |
| 5,008,930 | 4/1991 | Gawrys et al. | 379/210 |
| 5,062,060 | 10/1991 | Kolnick | 395/159 |
| 5,065,347 | 11/1991 | Pajak et al. | 395/159 |
| 5,097,528 | 3/1992 | Gursahaney et al. | 379/67 |
| 5,179,653 | 1/1993 | Fuller | 395/156 |

OTHER PUBLICATIONS

Macintosh System Software User's Guide v. 6.0, Apple Computer, 1988, pp. 14–43, 148–150.
Foss, "Tool for Reading and Browsing Hypertext", IP&M, 1989, pp. 407–418.

*Primary Examiner*—Mark R. Powell
*Assistant Examiner*—John E. Breene
*Attorney, Agent, or Firm*—Perman & Green

[57] ABSTRACT

A system and method for locating an object on a display screen is described which initially establishes, for display objects on a reference display screen, relative positional offsets of such objects from a benchmark object on the screen. When a new display screen is received and that corresponds to a display screen, the system responds to a command to access a requested object on the new display screen by finding the benchmark object on the new screen and determining the requested object's location by reference to preestablished relative position offsets from the found benchmark object.

9 Claims, 4 Drawing Sheets

AUTOMATIC LOCATION OF SCREEN OBJECTS THROUGH THE USE OF RELATIONAL POSITION DATA

This is a continuation of copending U.S. application Ser. No. 07/750,673 filed on Aug. 27, 1991, now abandoned.

FIELD OF THE INVENTION

This invention relates to a method and system for automatically determining the position of objects on a screen display and, more particularly, to a system which employs relational position information between display objects and a benchmark object on the screen display.

BACKGROUND OF THE INVENTION

Voice-based processing systems respond user-telephoned inquiries by providing intelligible voice response that provides the requested information. Some transactions which are now performed on voice-based processing systems are:

- the caller is requested to provide an account number via the telephone keypad, at which point, the processor employs the inputted number to find an account balance and then reads the balance to the caller;
- the system provides the caller with information such as current interest rates;
- the system enters information from the caller into a data base, such as the status of a sales order or a repair call; or
- the system places outgoing calls, automatically, for service orders or appointments, using data from a host computer.

Generally, voice-based processing systems employ interface unit which will hereafter be called a voice processing unit (VPU). A VPU is a trainable processor-based, voice-response system that replaces a human intermediary between the telephone inquirer and a host processor. One such prior art VPU is the IBM 9270. The 9270 VPU communicates with its host processor through a system of screen transactions. In specific, when the VPU receives an inquiry from a user, it requests a "screen" data from the host processor that includes the requested data. A screen is a pixel image prepared by application software in the host processor in response to an inquiry. The screen is supplied the VPU for the purpose of providing an answer in response to the inquiry. Since most, if not all, host processors have the ability to construct screen from an internal application program, the use of the screen as an interface enables a VPU interface with a variety of host processors that are not necessarily software compatible.

Once the VPU receives a screen, it must identify an object on the screen where the requested data can be found. This function was achieved in the 9270 by initially providing a training session for the VPU wherein host screens were supplied to enable the VPU to store information regarding the location of specific screen objects. Objects (e.g. fields) could be identified by attaching a label or by providing a row and column position indicator. Once the training was completed, the VPU would then have a library of label/position locations for each object which could then be used during a subsequent operation to enable location of the requested object.

So long as host-generated screens were static and did not change their position between training time and execution time, such location data was sufficient to enable the position of an object to be determined. However, it has been found that screens tend to be moved, edited, or positionally changed during processing. For example, scrolling actions occur where all objects within a screen are moved in tandem in a common direction. Once such screen movement occurs, all fixed positional data must be updated in order to enable the objects to be thereafter located. This updating is time consuming and often requires reentry into a training phase.

The prior art has disclosed various methods for locating data on screen displays. Clearly, the most widely used method is where a user positions a cursor at a chosen screen object. This method has no application where the user is replaced by an automatic response unit. Automatic object location systems of various types can be found in the following patents. Brudevold in U.S. Pat. No. 4,094,000, entitled "Graphics Display Unit" describes a display system wherein a "begin" register is employed to denote where an image object starts. When a screen is moved, the begin register value is incremented so as to enable its associated object to be moved accordingly. In other words, each object is associated with its "begin" value and by incrementing the begin value, the entire object can be moved, and later located.

Hevenor, Jr., U.S. Pat. No. 4,419,740 entitled "Method For Restoring And Retrieving Data" teaches the association of memory locations by providing a table that relates those location to given zones on a memory storage device. Ono, in U.S. Pat. No. 4,825,387 entitled "Frame Positioning Method" positionally relates microfiche frames in accordance with relative positional dimensions of a particular frame with respect to a pair of base or benchmark frames.

McCarthy et. al. in U.S. Pat. No. 4,905,168 entitled "Object Processing for Video System Using Slips and Linked List" describes a system for determining when a moving object in a video game collides with a fixed object. All moving objects are located by offsets from a reference point on a video game "playfield". Each time an object moves on the screen, its relative position to the reference point must be updated. The relative positions are employed to determine whether object collisions have occurred.

It is an object of this invention to provide an improved system for automatically locating screen objects.

It is another object of this invention to provide a voice response unit that operates in a screen interface mode with a screen object location method that enables objects to be located on the screen, notwithstanding screen movements.

SUMMARY OF THE INVENTION

A system and method for locating an object on a display screen is described which initially establishes, for display objects on a reference display screen, relative positional offsets of such objects from a benchmark object on the screen. When a new display screen is received and is found to match a reference display screen, the system responds to a command to access a requested object on the new display screen. It accomplishes this by finding the benchmark object on the new display screen and determining the requested object's location by reference to relative positioned offsets from the found benchmark object, as derived from the matching reference display screen.

DETAILED DESCRIPTION OF THE INVENTION

Figure 1:
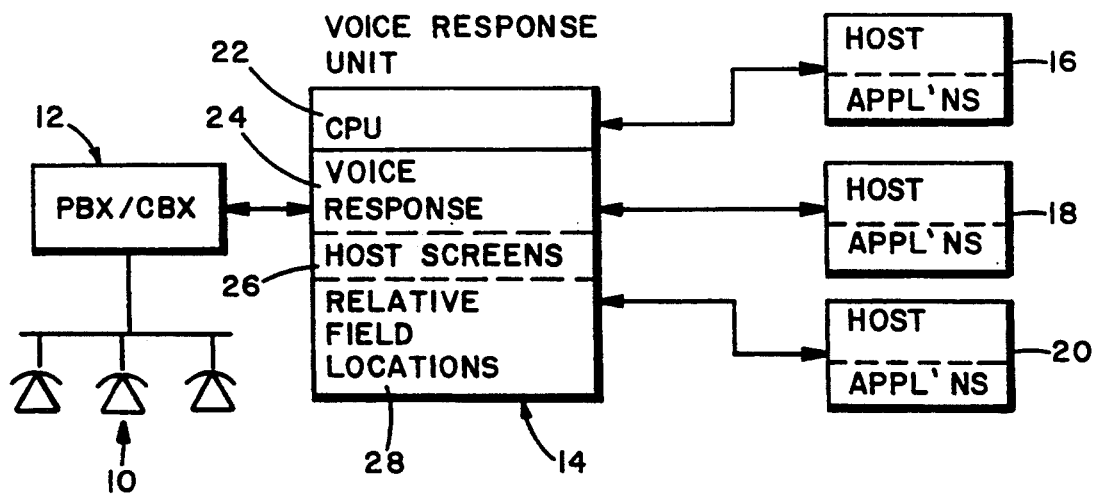
FIG. 1 is a high level block diagram showing the overall organization of the invention hereof.

Referring to FIG. 1, a plurality of touch tone phones 10 communicate through a PBX/CBX unit 12 to a voice response unit (VPU) 14. VPU 14 provides interface between telephones 10 and host processors 16, 18 20, each processor having one or more installed application programs. In the manner of the prior art VPU described above, VPU 14 responds to inquiries from a telephone 10 by initially determining which particular application is required to fulfill the user's inquiry. VPU then invokes a session with a connected host; logs onto the host's application; obtains a screen therefrom; finds the requested data on the screen; and provides the data via a voice response to the connected user. VPU 14 contains a central processing unit 22, a voice response module 24 and allocated memory blocks 26 and 28. Memory block 26 stores host screens and memory block 28 stores relative locations of objects in each of the host screens, those locations being relative to a benchmark in the screen in which the object is located.

Figure 2:
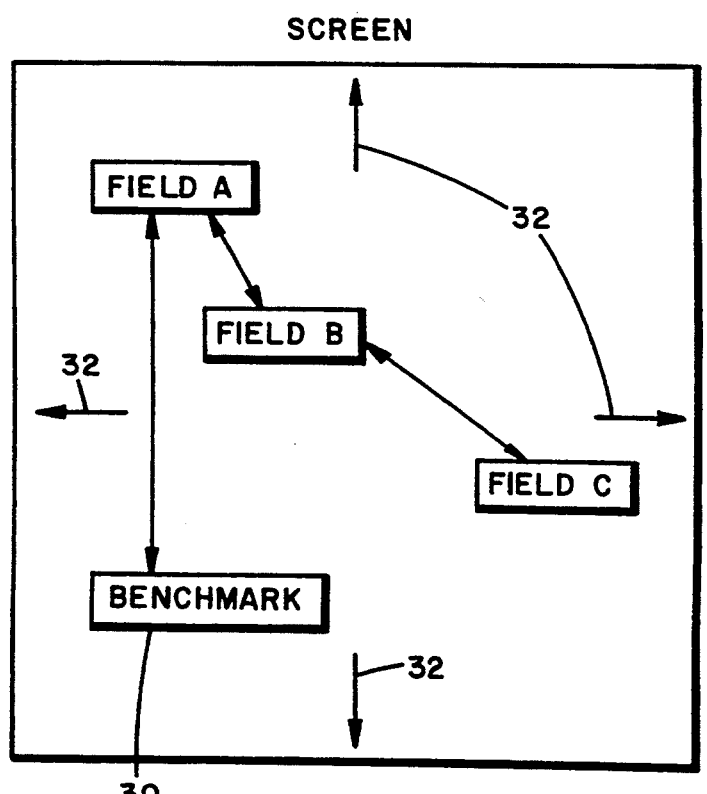
FIG. 2 is a schematic representation of a screen showing a plurality of fields and their relative positional relationships.

As shown in FIG. 2, a screen may comprise a plurality of objects (e.g. fields a, b, c) each one of which is located at a separate screen location. A benchmark 30 may be a screen label such as a title or any other object on the screen that is preselected by the user to be designated as the benchmark. Preferably, benchmark 30 is not altered during processing of the screen. As will be understood in further detail hereinafter, each of the objects on the screen is relationally located to benchmark 30. An object may either be directly relationally located, such as field A, or it may be indirectly located as are fields B and C. Thus, field A has an associated location indicator defining its relative location with respect to benchmark 30. Field B, on the other hand, has a relative location indicator with respect to field A and field C has a relative location indicator with respect to field B.

When a particular object on a screen is to be accessed, relative location storage area 28 in VPU 14 is accessed for the object's stored relative location indicator. If that relative location is with respect to a non-benchmark object, the relative location indicator for the referenced non-benchmark object is accessed, its relative location indicator is examined and the object referred to by its relative location information is accessed. This procedure continues until it is determined that benchmark 30 has been found. Then the search proceeds in the reverse direction, from object to object, using the position of benchmark 30 as the fixed point from which the search commences.

By using a benchmark object on the screen as the initial location from which an object search is commenced, all positions on the screen can be readily located. This is so even if the screen is scrolled in any of the directions shown by arrows 32 in FIG. 2. In such case, all objects on the screen move in tandem and their relative positional locations are maintained. Thus, even in the event of such screen movement, object location is enabled without the requirement of detailed record updating at each scroll increment. As a result, VPU 14 merely needs to locate benchmark 30 to enable it to find all other objects on the screen.

Figure 3:
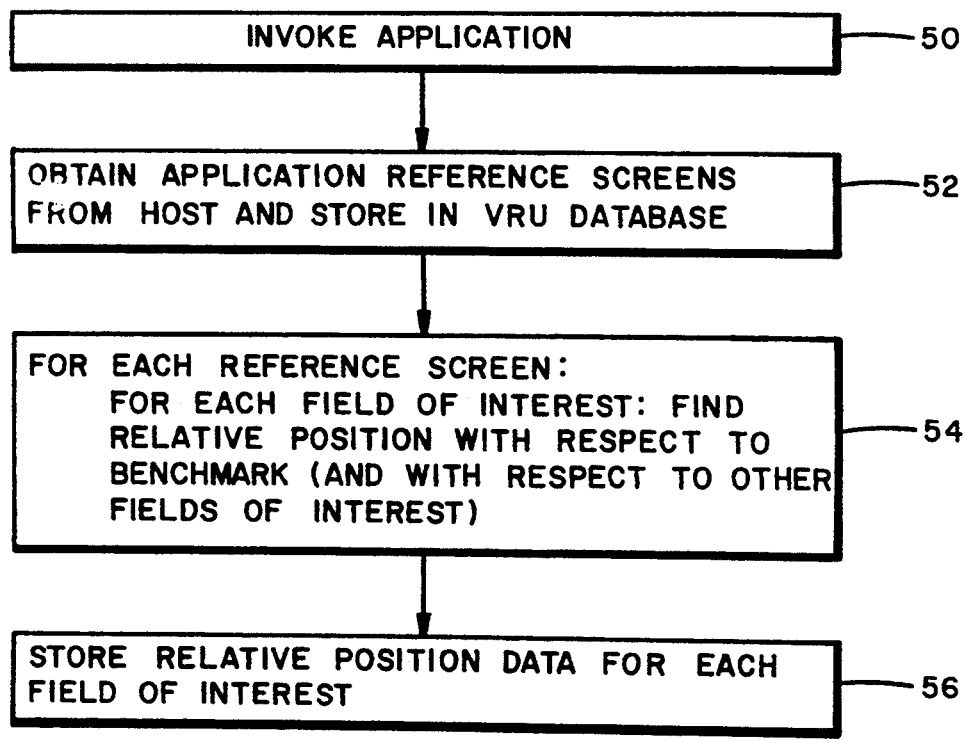
FIG. 3 is a high level flow diagram illustrating a training phase for the VPU shown in FIG. 1.
Figure 4:
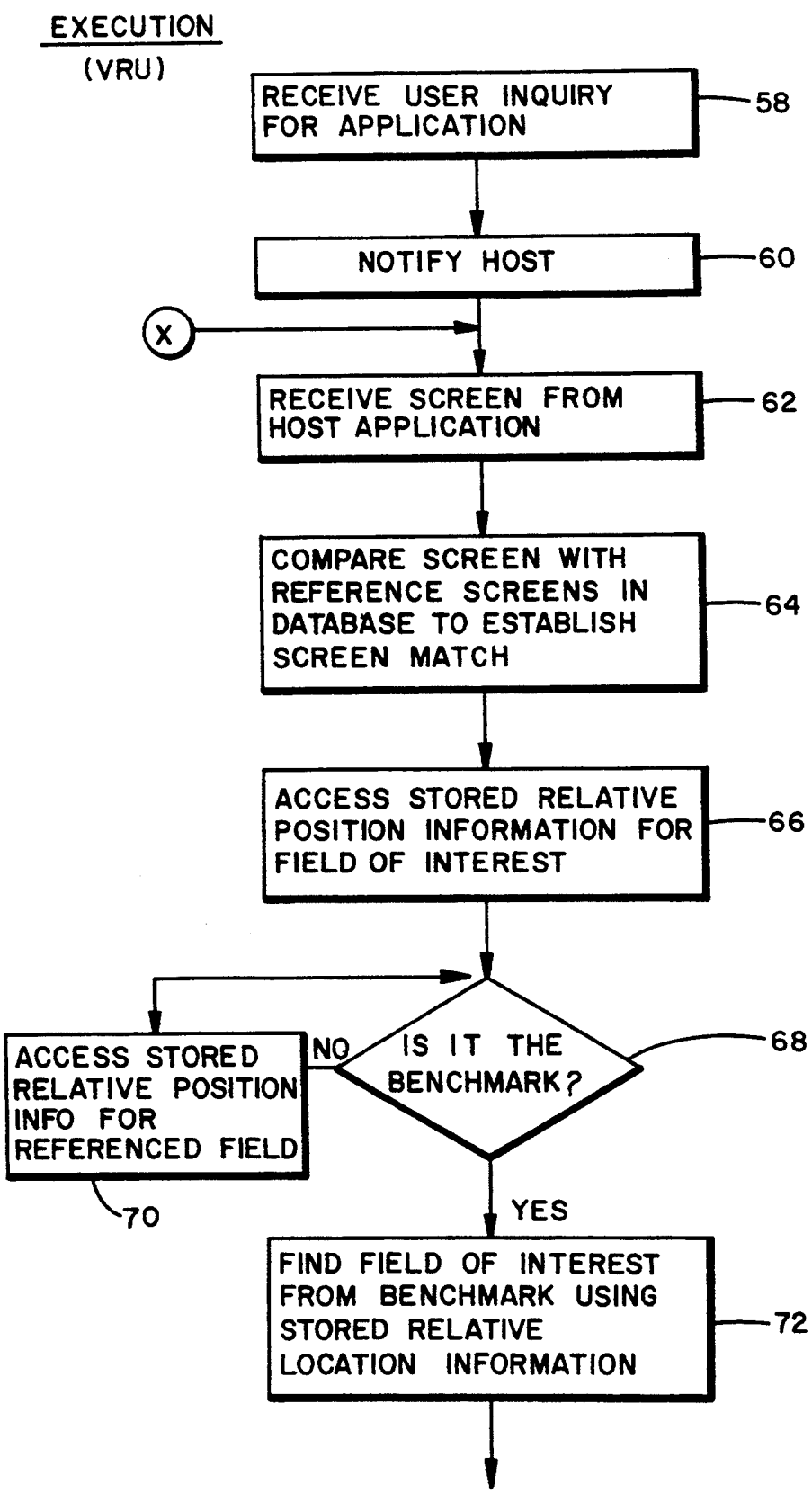
FIGS. 4 and 5 is a high level flow diagram theft illustrates the method performed by the VPU of FIG. 1 to locate a user-requested screen object.
Figure 5:
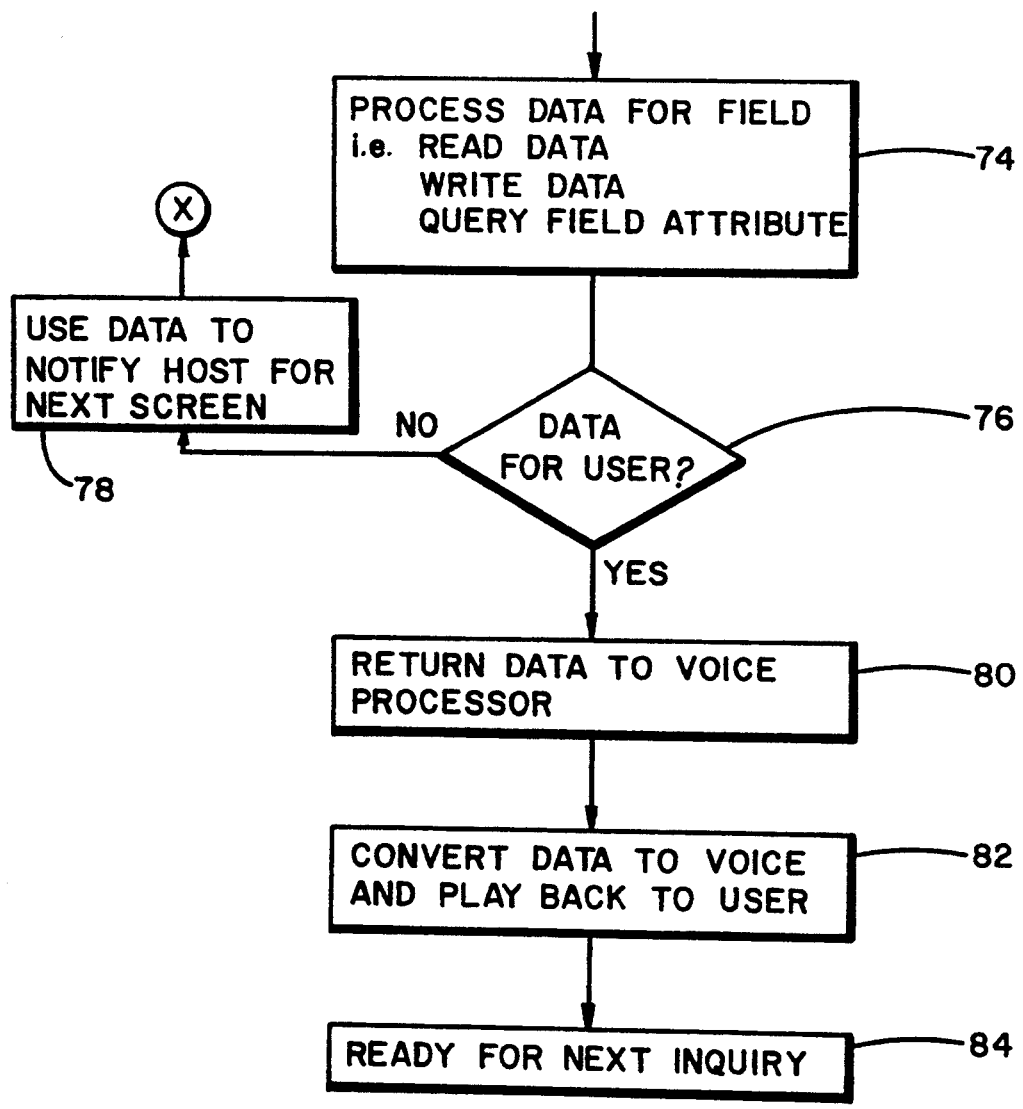

Turning now to FIGS. 3-5, the method employed by VPU 14 to establish the necessary data bases and to determine screen object locations will be described. As shown in FIG. 3, a training session for VPU 14 commences by invoking an application (box 50) in a connected host computer. VPU 14 then obtains application screens from the host, hereinafter called "reference" screens, and stores them in the VPU database (box 52).

For each reference screen, "training" is accomplished by defining for an object (e.g., a field of interest), its relative position with respect to a benchmark object on the screen. In addition, relative positions of certain screen objects can also be found with respect to other screen objects, so long as, in any chain of positionally related screen objects, the first object in the chain is the benchmark object, and succeeding chained objects are related on a positional basis with respect to a preceding object in the chain (box 54). Such a "chain" of positionally related screen objects will generally be employed where data in the respective fields is employed, in sequence, to respond to a user inquiry.

Once positional relationships are defined, they are stored in a database within the VPU so that each field of interest or screen object has an associated relational positioning indication (box 56). At this stage, the training function is complete. VPU 14 now has, for any particular application, a copy of reference screens to be used in the application and, for each reference screen, a relational position indication for each object on the screen, all objects being traceable back to a benchmark object. Turning now to FIGS. 4 and 5, "execution" time for VPU 14 will be described. It is assumed that a user inquiry is received via PBX/CBX 12. VPU 14 determines the particular application required to respond to the user inquiry (box 58) and notifies the host (box 60) that contains the requested application. VPU 14 is then supplied by the host with an initial screen from the application (box 62). VPU 14 compares the received screen with the reference screens stored in its database to establish a screen match and thus the identity of the initial application screen. This step is required because it often occurs that an application will initially transmit "housekeeping" screens which are not relevant to the user's inquiry and thus can be ignored. By providing a comparison function, additional processing of such housekeeping screens can be truncated and new screens requested. (This iterative function is not illustrated in the flow chart.)

Once the required screen is identified, the required screen object is identified and its relative positional indication is accessed from database 28. Thus, if the user is requesting account balance information, the account must first be identified by an account number. Such account number will be positioned on the screen and may be an initial "field of interest" (box 66).

Initially, VPU 14, as controlled by CPU 22, determines if the relative position indication accessed for the field of interest indicates that the referenced field is a benchmark (e.g., if the benchmark is a label, a label comparison can make this determination) (box 68). If it is not a benchmark, then the field that is referenced by the relative positional indication is accessed, along with its relative positional indication (box 70). Again, the relative positional indication is examined to determine whether the object it references is a benchmark. If not, the cycle continues until it is determined that the benchmark has been found. During this "rearward" search, each of the referenced objects is stored in a list so as to be accessible during the forward search.

Once the benchmark has been identified, it is positionally located on the screen, either from pre-stored positional information or through a partial or full screen search. The search for the desired screen object then proceeds in the opposite direction and increments back through the referenced object list until the "field of interest" is positionally determined.

The search proceeds by first accessing the relative positional indication between the benchmark and the first field in the search queue, thus allowing the first screen object to be positionally identified. Then, the next object is identified and its positional relationship to the first object is determined. This procedure continues until the desired object (field of interest) is located (box 72).

At this stage, data for (or from) the field is processed (box 74). In other words, data is either read from the field or written into the field. In addition, any field attribute associated with the field of interest can be queried.

At times, data accessed from a field may not be the ultimately required user data (see decision box 76). For instance, the accessed data may be the user's social security number which is then used to access a new screen wherein the required data is to be found. In such case, VPU 14 uses the found data to notify the host to provide a new screen (box 78), at which point the process cycles back to box 62 in FIG. 4 and the procedure continues. If on the other hand, the found data is the ultimate data for the user, then such data is returned to voice response unit 24 (box 80) where it is converted to voice and played back to the user (box 82). At this point, the system then readies itself for the next inquiry (box 84) and continues in that standby position until a new inquiry is received, at which time the procedure repeats.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a system including a processing unit and a computer that communicates with said processing unit by transmission of display screens, which display screens are stored by said processing unit, a method for enabling said processing unit to determine without user interaction a location of an object in a received, stored display screen, said processing unit performing the method comprising:

a. assigning to a first display object in a stored reference display screen, a relative positional offset from a benchmark object, said first display object and benchmark object moved together upon a scrolling action of said reference display screen, said benchmark object providing a reference from which positions of display objects are determined;

b. receiving a new display screen from said computer that matches said stored reference display screen; and c. locating a requested display object on said new display screen, said new display object corresponding to said first display object, by finding a location of said benchmark object on said new display screen and determining, without user interaction, a location of said requested display object on said new display screen by reference to said first display object's relative positional offset assigned in step (a).

2. The method as recited in claim 1, including a further step that occurs prior to step (a), said further step comprising:

storing data describing plural reference display screens and establishing relative positional offsets for display objects on said reference display screens, both from a benchmark object and as between display objects, and wherein step (b) further compares data describing said new display screen with data describing said stored plurality of reference display screens to find a match with one of said reference display screens.

3. The method as recited in claim 2, wherein, in step (c), relative positional offsets determined from a matching reference display screen enable location of a display object on said new display screen.

4. The method as recited in claim 3 wherein step (c) comprises the further substeps of:

finding a relative positional offset for said requested display object and determining if a benchmark object is referred to by said found relative positional offset and, if not, finding a relative positional offset for the display object referenced by said relative positional offset and determining if a benchmark object is referred to by that found positional offset; and repeating the aforesaid finding and determining substeps until a benchmark object is found.

5. The method as recited in claim 4 wherein said benchmark object is located by finding a memory location corresponding to the memory location where said benchmark object is stored in said matching reference screen, and if not found at said memory location, searching data stored in memory to find said benchmark object.

6. The method as recited in claim 5 wherein once said benchmark object is located, finding said requested display object by use of intermediate referenced display objects having linked relative positional offsets.

7. A voice inquiry system including a host computer and a voice processing unit (VPU), said host computer including application software and communicating with said VPU by providing display screens produced by said application software, said VPU comprising:

storage means for storing data corresponding to application generated reference display screens received from said host computer and positional offsets of display objects on each of said display screens, certain said positional offsets determined from a benchmark object which is used as a positional reference point on each said display screen;

processor means for responding to a user inquiry requesting a display object, by obtaining data corresponding to a new display screen containing said requested display object from said host computer;

means for searching said storage means to match said data corresponding to said new display screen with data corresponding to a stored reference display screen, a matching reference display screen containing another display object that corresponds to said requested display object; and means for searching said data corresponding to said new display screen for a benchmark object and determining a position of said requested display object on said new display screen from positional offset data for said another display object, as derived from data corresponding to said matching reference screen stored in said memory means.

8. The voice inquiry system as recited in claim 7, wherein a scroll movement of display objects on a said display screen causes concurrent movement of all display objects on said display screen, including a said benchmark object.

9. The voice inquiry system as recited in claim 8, wherein said storage means stores relative positional offsets of certain display objects from a benchmark object and stores relative positional offsets between display objects and other display objects, said relative positional offsets between display objects stored as a list that is arranged to enable said display objects to be located once said benchmark object is located.

* * * * *